United States Patent [19]

Komatsu et al.

[11] Patent Number: 5,254,915
[45] Date of Patent: Oct. 19, 1993

[54] MOTOR CONTROL DEVICE INCLUDING AN IMPROVED BRAKING CONTROL ARRANGEMENT

[75] Inventors: Hiroaki Komatsu, Ueda; Toshinobu Katafuchi, Fujiidera, both of Japan

[73] Assignee: Mita Industrial Co., Ltd., Japan

[21] Appl. No.: 909,744

[22] Filed: Jul. 7, 1992

[30] Foreign Application Priority Data

Jul. 15, 1991 [JP] Japan .................. 3-174063

[51] Int. Cl.⁵ .............................................. H02P 3/00
[52] U.S. Cl. .............................. 318/369; 318/274
[58] Field of Search .................... 318/60, 63, 269, 274, 318/362, 366, 368, 369, 370, 254, 138, 439, 85, 86, 273

[56] References Cited

U.S. PATENT DOCUMENTS

| | | | |
|---|---|---|---|
| 3,569,811 | 3/1971 | Miller et al. | 318/369 X |
| 3,725,758 | 4/1973 | Loyk | 318/369 X |
| 3,757,183 | 9/1973 | Nola | 318/254 |
| 3,906,315 | 9/1975 | Gotisar | 318/369 X |
| 3,944,899 | 3/1976 | Wright | 318/269 |
| 4,492,903 | 1/1985 | Knight et al. | 318/254 X |
| 4,623,827 | 11/1986 | Ito | 318/610 |
| 4,691,653 | 9/1987 | Neki et al. | 318/369 X |

FOREIGN PATENT DOCUMENTS 63-113481  5/1988  Japan .

Primary Examiner—Jonathan Wysocki
Attorney, Agent, or Firm—Beveridge, DeGrandi, Weilacher & Young

[57] ABSTRACT

A motor control device is used for controlling a DC motor for secondary paper feeding in, for example, a copying machine. Secondary paper feeding of paper to a transfer drum is achieved by the dedicated DC motor. The DC motor is rotated at a high speed at the time of starting the secondary paper feeding and is decelerated up to a process speed after a constant time. At the time of the deceleration, the control device applies a short-circuiting brake to the motor. In the short-circuiting brake, there is no variation in braking, thereby to make it possible to reliably decrease the speed of the motor. The braking is released at the timing at which an FG clock corresponding to the rotation of the motor is synchronized with a command clock representing the process speed. Consequently, a braking operation is reliably released the instant the speed of the motor reaches a desired process speed.

7 Claims, 6 Drawing Sheets

MOTOR CONTROL DEVICE INCLUDING AN IMPROVED BRAKING CONTROL ARRANGEMENT

BACKGROUND OF THE INVENTION

1. Field of the Invention

The present invention relates generally to a motor control device for controlling the rotation of a motor, and more particularly, to an improvement in braking control in a DC motor.

Furthermore, the present invention relates to a motor control device suitable for an image forming apparatus having a paper holder for holding paper to which an image is to be transferred such as a transfer drum.

2. Description of the Prior Art

Various types of motor control devices for rotating a DC motor at a constant speed have been conventionally proposed For example, U.S. Pat. No. 4,623,827 discloses a motor control device for detecting the speed of a DC motor by a pulse width of a rotary encoder mounted on the motor and carrying out feedback control of the motor on the basis of the difference between the detected speed and a predetermined set speed.

In this type of conventional motor control device, the difference between a command speed and the detected speed is generally found, and the driving of the motor is controlled by a control signal proportional to the difference in speed. When the rotational speed of the motor is decreased from a predetermined high speed to a predetermined low speed, control is carried out using the following procedure. More specifically, the command speed is switched from the predetermined high speed to the predetermined low speed. Consequently, there arises a large difference between the command speed and the detected speed Accordingly, a control signal proportional to this large difference in speed is applied to the motor, so that the speed of the motor which is being rotated at a high speed is decreased to the command speed.

However, this control has the disadvantage in that it takes long time for the rotational speed of the motor to reach the predetermined low speed because the speed of the motor is decreased, not by forced braking, but only by the control signal.

Furthermore, as the prior art of interest to the present invention, a color copying machine having a transfer drum has been known (see, for example, Japanese Patent Laid-Open Gazette No. 113481/1988). In this color copying machine, such a mechanism is used that at the time of copying, paper is held with it being wound around the peripheral surface of the transfer drum, and the transfer drum around which the paper is wound is rotated at a process speed for image formation with it being abutted on a photosensitive drum, to transfer to the paper an image formed on the photosensitive drum.

When the paper is fed to the transfer drum, the paper delivered is stopped once at the point in time when the front end thereof reaches a registration roller provided short of the transfer drum. The paper is fed to the transfer drum at predetermined timing by the registration roller. That is, so-called secondary paper feeding is achieved.

In this type of copying machine, the speed at which paper is conveyed is made higher than the peripheral speed of the transfer drum, that is, the process speed when the secondary paper feeding is started, and is returned to the process speed when the front end of the paper reaches the transfer drum. Such a change in speed has been conventionally made by a speed changing clutch connected to the registration roller.

The speed at which paper is conveyed is thus switched in the secondary paper feeding for the following reasons. More specifically, the variation in rise time of a registration roller driving clutch, the variation in distance from the registration roller to the transfer drum due to mounting errors of components of the copying machine, the distance between the position of the registration roller itself and a switch for detecting that the front end of the paper reaches the registration roller, and the like must be absorbed.

In such construction that the speed at which paper is conveyed is switched by the speed changing clutch, however, there is no problem while the copying machine is new, but a problem is encountered that the speed changing clutch is slid due to changes with age.

Furthermore, in a method of switching the speed using the speed changing clutch, there is a variation in time for switching by the clutch. Accordingly, there is a problem that it takes a lot of time and labor to make adjustments because copying machines must be adjusted one at a time with a clutch being mounted thereon. In addition, there is a problem that only unstable adjustments can be made because it is difficult to judge with eyes whether or not the timing of operating the clutch is suitable.

The problems should be avoided by not switching the rotational speed of the registration roller using the speed changing clutch, but by providing a dedicated motor and changing the rotational speed itself of the motor to switch the rotational speed of the registration roller.

The present invention has been made on the basis of such a technical background.

Meanwhile, various types of control devices for controlling the rotational speed of a motor at a constant speed have been proposed as described above.

However, the use of the conventionally known motor control device without any modification is not suitable for control of the registration roller driving motor in the above described copying machine. The reason for this is that the registration roller driving motor must be rotated at a high speed when the secondary paper feeding is started and must be so controlled that the speed thereof is decreased to a process speed in a short time and without any variation after an elapse of a constant time.

SUMMARY OF THE INVENTION

Therefore, an object of the present invention is to provide a motor control device incorporating new deceleration control which is a solution to the problems of such deceleration control.

In the present invention, in order to decrease the speed of a motor which is being rotated at a higher speed than a reference speed to the reference speed, the supply of power to the motor is cut off to keep the motor in the short-circuited state, so that the motor is braked. During the braking operation, a speed pulse corresponding to the rotational speed of the motor and a reference pulse corresponding to the reference speed are compared with each other. The braking operation is released at the timing at which the speed pulse is synchronized with the reference pulse.

Constant-speed control is generally so carried out that the motor is rotated at a constant speed. The constant-speed control is carried out by so adjusting a control current that the reference speed becomes equal to the detected speed.

It is assumed that a signal to decrease the speed of the motor to a predetermined reference speed is applied when the motor is rotated at a predetermined high speed, for example, when the speed at which paper is conveyed is made high at the time of starting secondary paper feeding in a registration roller rotating motor in a copying machine. The supply of power to the motor is cut off in response to this signal, to keep the motor in the short-circuited state. Consequently, a back electromotive force is produced in the motor so that a short-circuiting brake is applied Accordingly, the rotational speed of the motor is forced to be decreased.

During the deceleration, the period of the speed pulse is changed. When the speed pulse is synchronized with a predetermined reference pulse, the braking operation is released at the timing. Accordingly, the motor is rotated at a constant reference speed at that point in time and afterward.

According to the present invention, when the speed of the motor is decreased from a high speed to a desired constant speed, it is possible to perform a braking operation which is not significantly affected by fluctuations in load and changes with time and is permanently stable.

Additionally, if the present invention is applied to an image forming apparatus, the speed of the motor can be decreased from a high speed to a predetermined reference speed (process speed) in a short time and without any variation, thereby to make it possible to form a good image without causing an irregularity in conveyance of paper and distortion of an image at the time of forming an image.

Furthermore, the adjustment of the timing of braking may be made only when the brake is on. When the brake is off, the adjustment is automatically made depending on whether or not the speed of the motor is synchronized with the command speed. Accordingly, it is possible to provide a motor control device which need not adjust the length of time when a brake is applied and is high in practicability and versatility.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A paper feeding control motor in a color copying machine will be described by way of example as one embodiment of the present invention with reference to the drawings.

Figure 1:
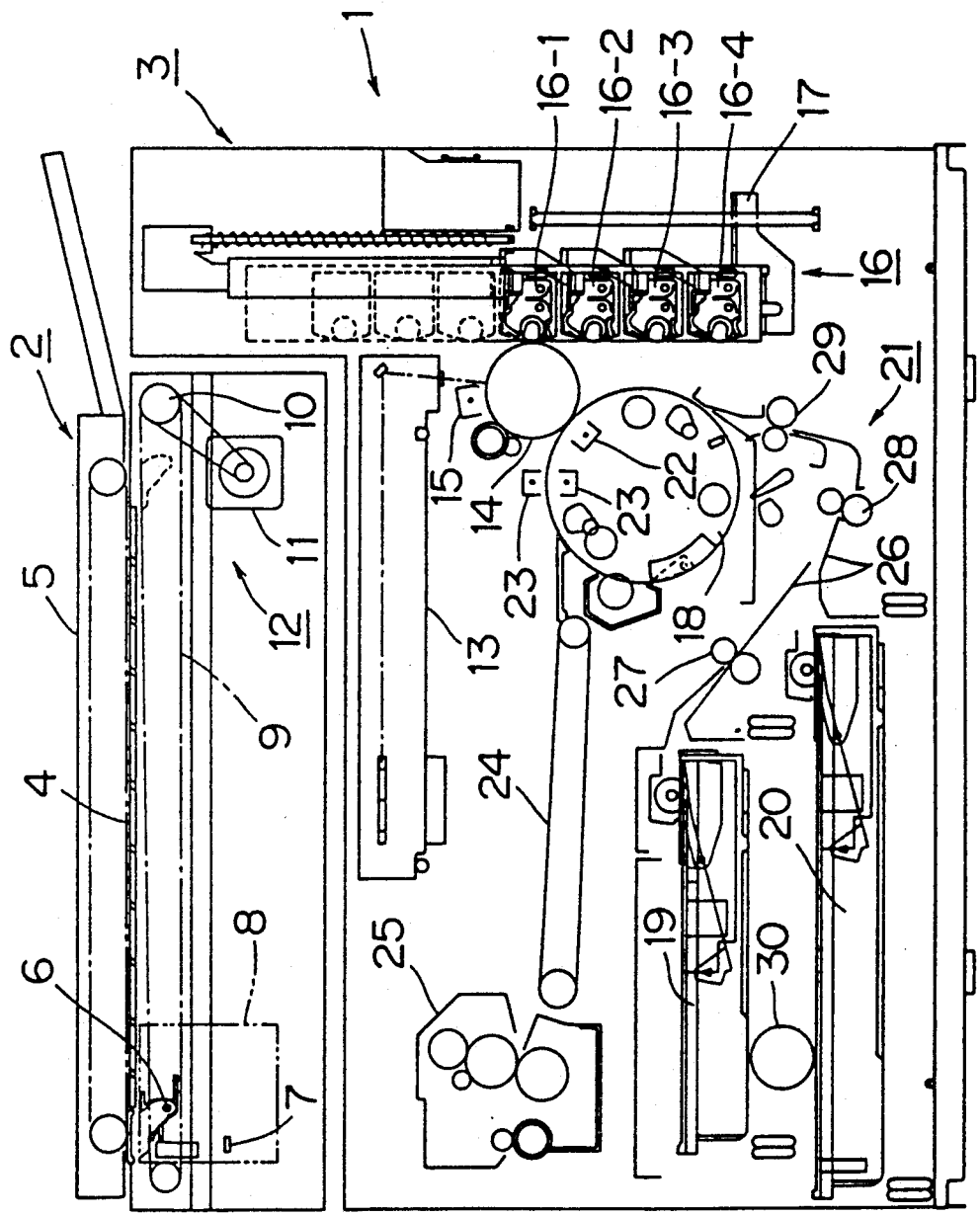
FIG. 1 is a cross sectional view illustrating the schematic construction of a full color copying machine having a motor control device according to one embodiment of the present invention.

FIG. 1 is a cross sectional view illustrating the schematic constriction of a full color copying machine according to one embodiment of the present invention.

A full color copying machine 1 comprises a scanner section 2 and a printer section 3.

The scanner section 2 comprises a transparent platen 4 on which a document is mounted at the time of reading, an automatic document feeder (ADF) 5 for automatically setting a document on the transparent platen 4 and withdrawing the same, a scanning and reading portion 8 so adapted that the document is illuminated by a lamp 6 from the lower surface of the transparent platen 4 and the contents of the document are read out by a CCD line sensor 7, a wire 9 for scanning the scanning and reading portion 8, and a reading portion moving device 12 comprising a pulley 10, a motor 11 and the like.

The printer section 3 comprises a laser scanner unit (LSU) 13 for outputting laser light on the basis of a signal applied from the CCD line sensor 7 in the scanning and reading portion 8, a photosensitive drum 14 on which an electrostatic latent image is formed by the laser light outputted from the LSU 13, and a charging corona discharger 15 for uniformly charging the surface of the photosensitive drum 14. The surface of the photosensitive drum 14 which is rotated in a clockwise direction in the drawing at a constant process speed is uniformly charged by the charging corona discharger 15. If the surface of the photosensitive drum 14 is irradiated by the laser light from the LSU 13, charges in the irradiated part thereof are removed, to form an electrostatic latent image on the photosensitive drum 14.

The printer section 3 is further provided with a developing device 16 for developing the electrostatic latent image formed on the photosensitive drum 14. The developing device 16 comprises four developer units 16-1, 16-2, 16-3 and 16-4 and an elevator mechanism 17 for raising and lowering the four developer units 16-1, 16-2, 16-3 and 16-4. The four developer units 16-1, 16-2, 16-3 and 16-4 respectively store toner particles having different colors, and an electrostatic latent image is developed by the toner particles having the color stored in the developer unit which is abutted on the photosensitive drum 14.

In the present embodiment, the developer units 16-1, 16-2, 16-3, and 16-4 respectively store magenta toner particles, cyan toner particles, yellow toner particles, and black toner particles.

The printer section 3 further comprises a transfer drum 18 as paper holding means for holding paper at the time of transfer. The transfer drum 18 is provided with the peripheral surface thereof being brought into contact with the peripheral surface of the photosensitive drum 14. At the time of forming an image, the transfer drum 18 is rotated in a counterclockwise direction in the drawing, and the peripheral speed thereof is set to a process speed equal to the peripheral speed of the photosensitive drum 14.

The printer section 3 further comprises a paper feeding path 21 for conveying paper fed from a paper feeding cassette 19 or 20 to the transfer drum 18, a transferring corona discharger 22 for transferring a toner image on the photosensitive drum 14 to the paper held by the transfer drum 18, a separating corona discharger 23 for separating from the transfer drum the paper to which the toner image is transferred, a delivery belt 24 for conveying the paper separated from the transfer drum 18, and a fixing device 25 for fixing the toner image on the paper.

The above described paper feeding path 21 comprises a paper guide plate 26, two pairs of delivery rollers 27 and 28, and a pair of registration rollers 29. In addition, there is provided a dedicated DC motor 30 for rotating the delivery rollers 27 and 28 and the registration rollers 29. The rotation of the DC motor 30 is provided to the delivery rollers 27 and 28 and the registration rollers 29 through clutches (not shown), respectively.

Figure 2:
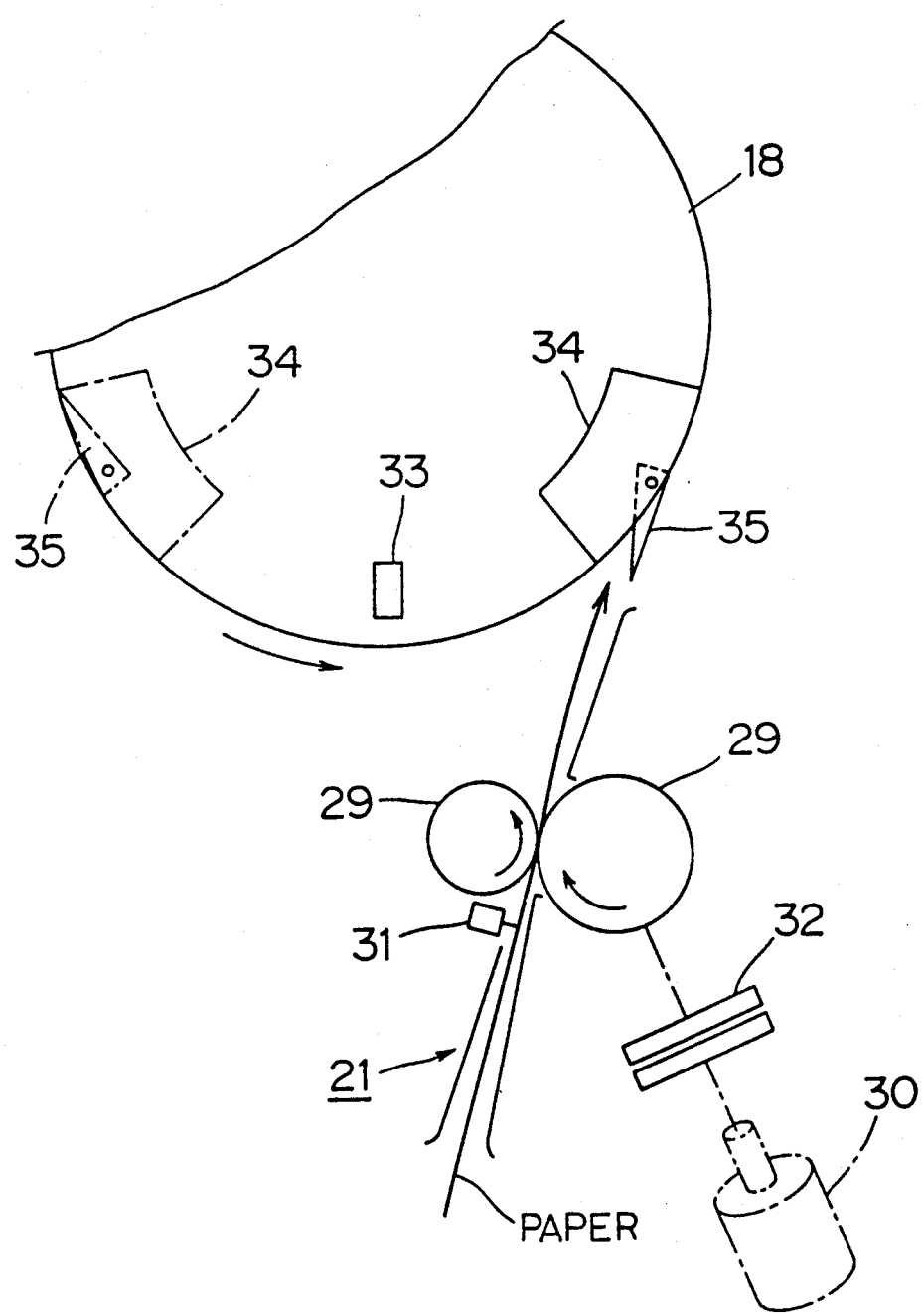
FIG. 2 is a cross sectional view illustrating portions associated with the present invention of the full color copying machine shown in FIG. 1.

FIG. 2 is an enlarged view showing the registration rollers 29 and a part of the transfer drum 18 in FIG. 1.

Description is made with reference to FIG. 2. When a micro switch 31 provided just short of the registration rollers 29 is turned on, it is determined that the front end of paper conveyed in the paper feeding path 21 reaches the registration rollers 29. A registration clutch 32 for providing the rotation of the DC motor 30 to the registration rollers 29 is turned off, so that the registration rollers 29 are stopped once.

Furthermore, there is provided a reference position switch 33 in connection with the transfer drum 18. The reference position switch 33 is not rotated, unlike the transfer drum 18, and is constituted by, for example, a light sensor fixed to a predetermined position of a frame or the like of the copying machine 1. On the other hand, a shade 34 is fixed to the transfer drum 18. When the transfer drum 18 is rotated to a predetermined angular position, the front end of the shade 34 crosses the reference position switch 33, so that the reference position switch 33 is switched, for example, from the on state to the off state. In addition, when the rear end of the shade 34 crosses the reference position switch 33, the reference position switch 33 is switched from the off state to the on state.

The transfer drum 18 is also provided with a clip 35 for holding, when paper is held, the front end of the paper. The clip 35 is driven by a solenoid (not shown) and is switched to the opened state where paper is received and the closed state where paper is held.

Therefore, the angular position in rotation of the transfer drum 18 can be confirmed on the basis of the timing at which the reference position switch 33 is switched, for example, from the off state to the on state. More specifically, the position of the clip 35 can be confirmed. In addition, the registration clutch 32 is turned on in conformity to the angular position in rotation of the transfer drum 18, to start secondary paper feeding by the registration rollers 29.

In the present embodiment, at the time of starting the secondary paper feeding, the DC motor 30 is previously rotated at a predetermined high speed, and the registration clutch 32 is turned on so that the registration rollers 29 are rotated at a high speed, to start the secondary paper feeding at a higher speed than a process speed. The DC motor 30 is then braked at predetermined timing based on the timing at which the reference position switch 33 is switched. When the speed of the paper feeding becomes the process speed, that is, coincides with the peripheral speed of the transfer drum 18, the braking of the DC motor 30 is released.

One of the characteristics of the present embodiment is that the above described DC motor 30 is braked by control as described in detail below.

Figure 3:
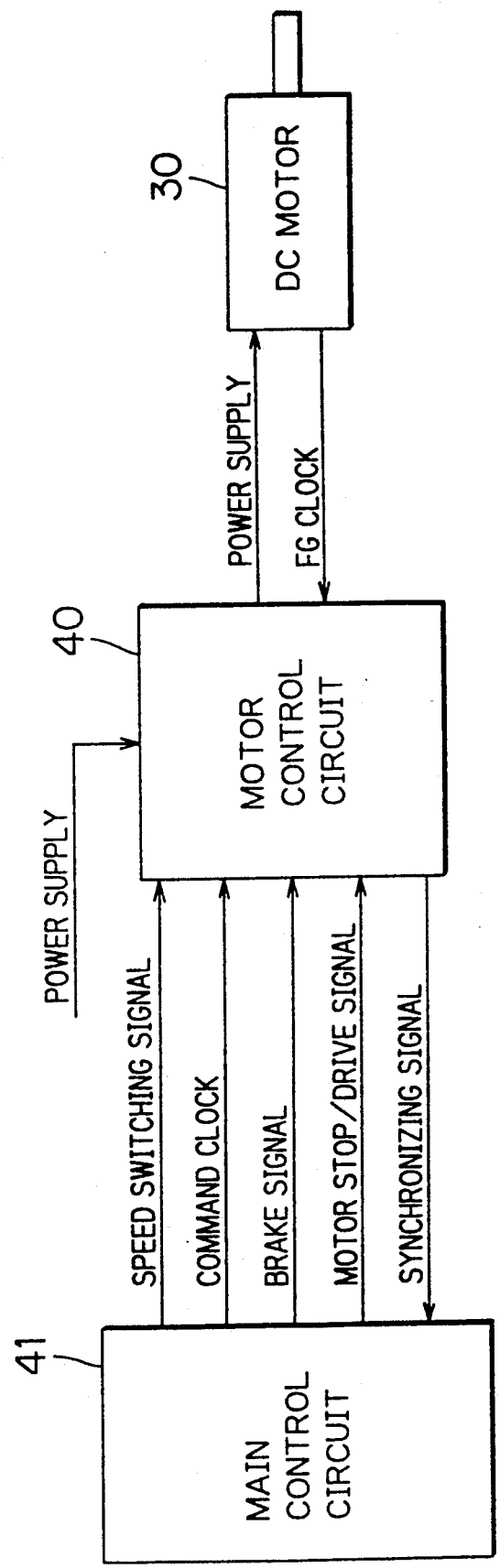
FIG. 3 is a block diagram illustrating the construction of a motor control circuit of a DC motor for paper feeding in the copying machine shown in FIG. 1.

FIG. 3 is a block diagram associated with a control circuit of the DC motor 30 in the above described copying machine 1. A motor control circuit 40 is under the control of a main control circuit 41 for controlling the entire copying machine 1. A speed switching signal, a command clock serving as a speed command pulse, a brake signal and a motor stop/drive signal are applied to the motor control circuit 40 from the main control circuit 41. On the other hand, a synchronizing signal is outputted from the motor control circuit 40 to the main control circuit 41.

The motor control circuit 40 detects an FG clock serving as a speed pulse applied from the DC motor 30 (strictly, a frequency generator connected to the axis of rotation of the DC motor 30) and supplies power to the DC motor 30 so that the FG clock is synchronized with the command clock.

Figure 4:
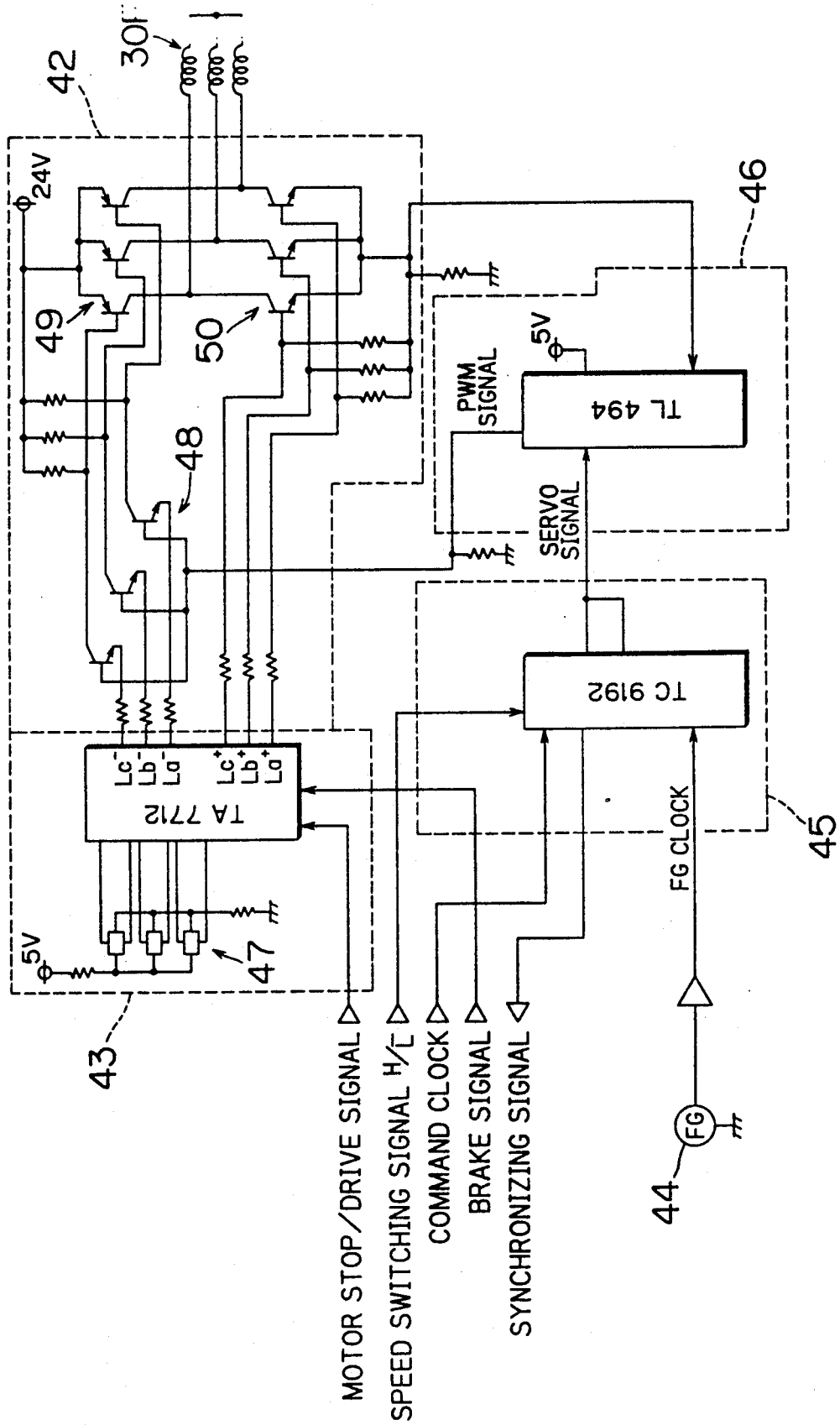
FIG. 4 is a diagram showing a specific circuit arrangement of the motor control circuit shown in FIG. 3.

FIG. 4 is a diagram illustrating a specific circuit arrangement of the motor control circuit 40.

The motor control circuit 40 mainly comprises four circuit blocks. More specifically, a first circuit is a motor driving circuit 42 for supplying a current required for a field winding 30F of the DC motor 30. In addition, a second circuit is a three-phase distributing circuit 43 for respectively carrying out on-off control of sets of transistors 48, 49 and 50 in the motor driving circuit 42 in a predetermined order. Furthermore, a third circuit is a servo circuit 45 for outputting a servo signal on the basis of the FG clock applied from the frequency generator 44 connected to the axis of rotation of the DC motor 30 and the command clock applied from the main control circuit 41. A fourth circuit is a PWM converting circuit 46 for generating a PWM (pulse width modulation) signal on the basis of the servo signal outputted from the servo circuit 45 and applying the signal to the motor driving circuit 42 to carry out on-off control of the set of transistors 48 in the motor driving circuit 42.

Although in the present embodiment, description was made of an example in which the frequency generator 44 is connected to the axis of rotation of the DC motor 30, the frequency generator 44 may be replaced with a rotary encoder which outputs a pulse every time the axis of rotation of the motor 30 is rotated through a very small angle.

Figure 5:
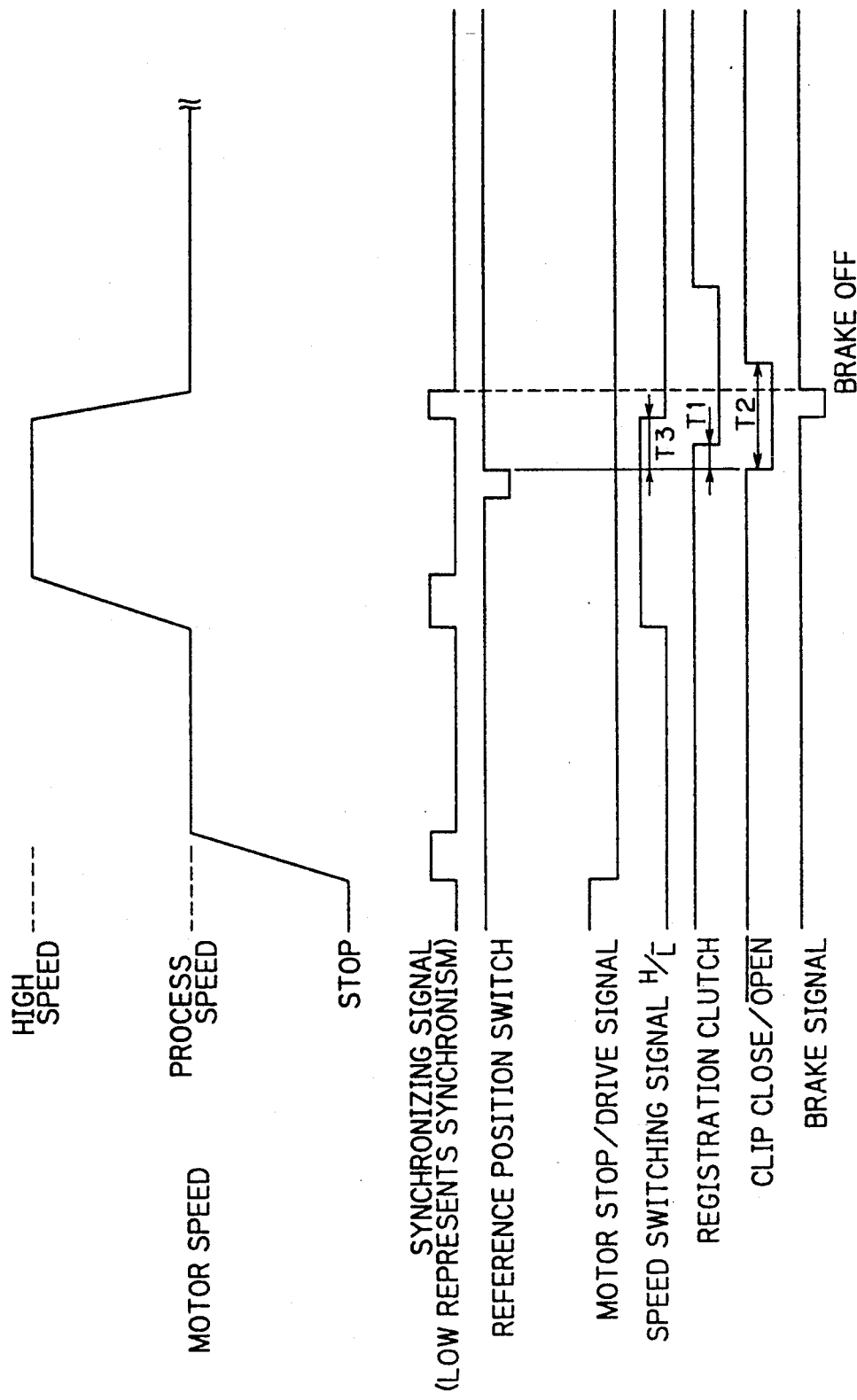
FIG. 5 is a timing chart showing an operation of the motor control circuit shown in FIG. 4.

FIG. 5 is a timing chart for explaining the operation of the motor control circuit 40 shown in FIG. 4.

Referring mainly to FIGS. 4 and 5, description is now made of the operation of the motor control circuit 40 according to the present embodiment.

When a motor stop/drive signal applied from the main control circuit 41 attains the low level, the positional relationship between a rotor and the field winding of the DC motor 30 is detected by three Hall devices 47 in the three-phase distributing circuit 43, and high-level or low-level signals are outputted in a predetermined order and at predetermined timing from six output terminals Lc-, Lb- and La- and Lc+, Lb+ and La+ on the basis of the positional relationship.

Consequently, the three sets of transistors 48, 49 and 50 in the motor driving circuit 42 are respectively turned on in a predetermined order and at predetermined timing. Accordingly, a current flows through the motor field winding 30F, so that the DC motor 30 starts to be rotated.

A command clock is applied to the servo circuit 45 from the main control circuit 41 simultaneously with the low-level drive signal. The first command clock is a clock for commanding a process speed which is a reference speed.

The servo circuit 45 compares an FG clock applied from the frequency generator 44 connected to the DC motor 30 which started to be rotated with the command clock. At the time of starting the DC motor 30, the FG clock is a clock having a period longer than that of the command clock. Accordingly, a servo signal to accelerate the motor 30 is applied to the PWM converting circuit 46 from the servo circuit 45. In response to the servo signal, a high-level signal of a 100% duty ratio, for example, is outputted from the PWM converting circuit 46, so that the speed of the DC motor 30 is transiently increased.

When it is detected in the servo circuit 45 that the FG clock is synchronized with the command cock, a synchronizing signal outputted from the servo circuit 45 to the main control circuit 41 changes from the high level to the low level. In addition, such a servo signal as to maintain synchronization of the FG clock and the command clock is outputted, and a PWM signal which is repeatedly switched between the high level and the low level at a predetermined ratio on the basis of the servo signal is outputted from the PWM converting circuit 46.

While the DC motor 30 is rotated at a process speed, control of paper feeding is carried out by the main control circuit 41. More specifically, paper is delivered from the paper feeding cassette 19 or 20 shown in FIG. 1, the clutches of the delivery rollers 27 and 28 and the registration rollers 29 is turned on, the delivery rollers 27 and 28 and the registration rollers 29 are rotated at the process speed by the DC motor 30, and the paper is conveyed to the registration rollers 29.

The micro switch 31 (see FIG. 2) provided short of the registration rollers 29 is turned on, so that the registration clutch 32 is turned off. Accordingly, paper feeding is stopped once in the stage in which the front end of the paper reaches the registration rollers 29.

On the other hand, as shown in FIG. 5, a speed switching signal for switching the speed to a high speed is outputted from the main control circuit 41 at predetermined timing, and this signal is applied to the servo circuit 45. At the same time, the command clock is switched to a clock for commanding the rotation at a predetermined high speed.

A servo signal for accelerating the rotation of the motor is outputted from the servo circuit 45 in response to the signals, and a PWM signal corresponding to the servo signal is outputted from the PWM converting circuit 46. Accordingly, the motor driving circuit 42 increases a current flowing through the motor field winding 30F, thereby to increase the rotational speed of the DC motor 30.

While the speed of the DC motor 30 is increased, the synchronizing signal outputted from the servo circuit 45 attains the high level representing asynchronism.

In the servo circuit 45, when the FG clock applied from the frequency generator 44 is synchronized with the command clock for commanding the rotation at a high speed, the synchronizing signal is switched to the low level, so that such a servo signal as to hold the synchronized state is outputted. Accordingly, the DC motor 30 is rotated at a predetermined high speed.

In this state, the timing at which the shade 34 (see FIG. 2) in the transfer drum 18 which is rotated in synchronization with the photosensitive drum 14 switches the reference position switch 33 from the off state to the on state is detected.

At the timing at which the reference position switch 33 is switched from the off state to the on state, the clip 35 provided for the transfer drum 18 is opened. The clip 35 is opened for a predetermined time T2.

In addition, the registration clutch 32 shown in FIG. 2 is turned on after an elapse of a predetermined delay time T1 (this delay time T1 is set on a program in the main control circuit 41) from the timing at which the reference position switch 33 is switched from the off state to the on state. Consequently, secondary paper feeding is started.

When the registration clutch 32 is turned on to start the secondary paper feeding, the DC motor 30 is being rotated at a predetermined high speed higher than the process speed. Accordingly, the secondary paper feeding by the registration rollers 29 is started at a speed higher than the peripheral speed of the transfer drum 18.

Then, the speed switching signal applied from the main control circuit 41 is reversed to the low level after an elapse of a predetermined time T3 from the timing at which the reference position switch 33 is switched from the off state to the on state. At the same time, the command clock is also switched from the clock representing the predetermined high speed to a command clock representing the process speed having a period longer than that of the clock.

This predetermined time T3 is set by experimentally finding a time elapsed from the start of the secondary paper feeding at a high speed by the registration rollers 29 until the front end of the paper approaches the vicinity of the clip 35.

Meanwhile, the above described predetermined time T3 is a time calculated on the program in the main control circuit 41. This time T3 may be replaced with a predetermined time T4 (T4 = T3 - T1). That is, control may be so carried out on the basis of the timing at which the registration clutch 32 is turned on that the speed switching signal attains the low level after an elapse of the time T4 from the timing. A low active brake signal is outputted to the three-phase distributing circuit 43 from the main control circuit 41 in response to the transition of the above described speed switching signal to the low level. The three-phase distributing circuit 43 controls an output in response to the brake signal so that the sets of transistors 48 and 49 in the motor driving circuit 42 are all turned off and the set of transistors 50 are all turned on. Consequently, the supply of a current to the motor field winding 30F is cut off, and the motor field winding 30F is brought into the short-circuited state by the transition of the set of transistors 50 to the on state.

Meanwhile, the rotor of the DC motor 30 continues to be rotated. A back electromotive force is produced in the rotor, so that the DC motor 30 is rotated as a dynamo-electric generator. Accordingly, a large braking force is caused by the back electromotive force. This is one of the characteristics of the control in the present embodiment.

Figure 6:
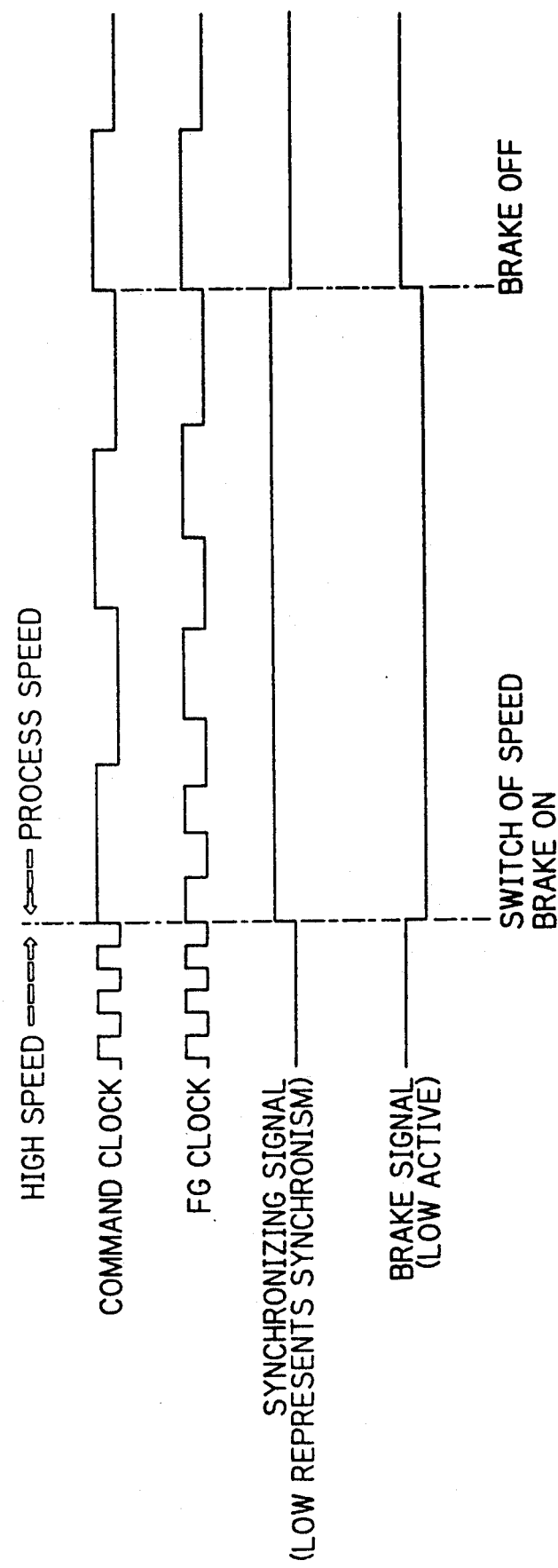
FIG. 6 is a timing chart showing in detail characteristic portions of the timing chart of FIG. 5.

FIG. 6 is a timing chart for explaining the timing at which braking is released. Description is now made with reference to FIG. 6.

The FG clock is applied to the servo circuit 45 from the frequency generator 44 by the rotation of the rotor of the DC motor 30. The servo circuit 45 compares the FG clock with the command clock which is switched to the process speed, to switch the synchronizing signal to the low level at the timing at which the FG clock is synchronized with the command clock. The main control circuit 41 brings the brake signal into the high level in response to the transition of the synchronizing signal to the low level, to transmit the release of the braking to the three-phase distributing circuit 43.

Thereafter, therefore, the speed of the DC motor 30 is controlled on the basis of the servo signal outputted from the servo circuit 45, so that the DC motor 30 is rotated at the process speed.

Thereafter, the clip 35 is closed, as shown in FIG. 5. When the clip 35 is closed, the DC motor 30 is being rotated at the process speed, so that the speed at which paper is conveyed by the registration rollers 29 is made equal to the peripheral speed of the transfer drum 18 Accordingly, there occur no unfavorable phenomena, such as the phenomena that the rear part of paper whose front end is held by the clip 35 is made slack because the speed at which paper is conveyed by the registration rollers 29 is, for example, higher than the peripheral speed of the transfer drum 18 or conversely, paper held by the clip 35 is pulled because the speed at which paper is conveyed by the registration rollers 29 is lower than the peripheral speed of the transfer drum 18.

Furthermore, after the start of the braking, the short-circuiting brake is applied to the DC motor 30. Accordingly, a strong braking force is exerted on the DC motor 30, thereby to make it possible to reduce the speed of the DC motor 30 to the process speed in a short time.

Additionally, the timing at which the braking is released need not be adjusted because the braking is automatically released depending on whether or not the FG clock is synchronized with the command clock. That is, the braking is released depending on whether or not the speed of the DC motor 30 actually reaches a desired process speed. According to the present embodiment, therefore, there is no variation in the amount of braking. In addition, the braking is not changed with time, so that permanently stable braking performance is obtained, thereby to reliably achieve the secondary paper feeding to the transfer drum.

Although description was made on the braking control of the DC motor 30 for paper feeding in the full color copying machine 1, the motor control device according to the present invention can be effectively applied to other motors.

For example, in the above described full color copying machine 1, a dedicated motor may, in some cases, be provided so as to drive the delivery belt 24 (see FIG. 1). The delivery belt 24 is generally rotated in synchronization with the photosensitive drum 14 and the transfer drum 18 by a main motor (not shown). However, there is a case where it is desired to set the fixing speed in the fixing device 25 to a predetermined speed lower than a process speed. In such a case, the speed of the delivery belt 24 for feeding paper to the fixing device 25 must conform to the speed of the fixing device 25. In such a case, there is provided a dedicated motor for driving the delivery belt 24.

Examples of the case where it is desired to make the fixing speed in the fixing device 25 lower include a case where an image is copied on a transparent sheet for an over head projector, and a case where an image is copied on thick paper. If the sheet or paper on which an image is to be copied is thus thick, an image must be firmly fixed by reducing the fixing speed in the fixing device 25 and increasing the fixing temperature as required to sufficiently heat the sheet or paper.

Meanwhile, when copies are made on the transparent sheet for an over head projector, an image is transferred to the sheet with the transparent sheet being wound around the transfer drum 18. The sheet on which the image has been transferred is separated from the transfer drum 18 by the separating corona discharger 23, and is led to the delivery belt 24.

The rotational speed (peripheral speed) of the transfer drum 18 is the process speed as described above. Accordingly, the moving speed of the transparent sheet separated from the transfer drum 18 and moved to the delivery belt 24 is also the process speed. Therefore, the delivery belt 24 is moved at the process speed at this point in time. The sheet separated from the transfer drum 18 which is rotated at the process speed is moved to the delivery belt 24 at the process speed, and is moved at the process speed also in the delivery belt 24. Accordingly, there is no possibility that the moving speed of the sheet is reduced the instant the sheet is moved to the delivery belt 24 from the transfer drum 18, so that the sheet is made to flex during the movement.

On the other hand, after the rear end of the transparent sheet is separated from the transfer drum 18 and while the front end of the transparent sheet is led to the fixing device 25 by the delivery belt 24, it is necessary to decrease the speed of the delivery belt 24 to the fixing speed lower than the process speed. That is, the speed of the delivery belt 24 must be decreased to a constant speed (fixing speed) in a short time and without any variation.

In such a case, the dedicated motor for driving the delivery belt 24 can be decelerated reliably in a short time and accurately up to a predetermined speed by the braking control according to the present invention.

Alternatively, the braking control according to the present invention can be also utilized for control of the optical system driving motor 11 (see FIG. 1) in the above described full color copying machine 1.

The optical system driving motor 11 moves the scanning and reading portion 8 to the direction of illuminating and scanning by the forward rotation. Thereafter, in order to return the scanning and reading portion 8 to its home position, the motor 11 is rotated in the reverse direction. The motor 11 is first rotated at a high speed at the time of the reverse rotation. Thereafter, when the scanning and reading portion 8 passes a predetermined position, the motor 11 is braked. The present invention is used for the braking control, thereby to make it possible to effectively brake the optical system driving motor 11 in a short time.

More specifically, the optical system driving motor 11 which is being rotated in the reverse direction is braked at a certain time point, but the speed thereof is not decreased to "O". The motor 11 which is being rotated in the reverse direction at a high speed is so braked that the speed thereof reaches a predetermined low speed. The speed of the motor 11 is made low to move the scanning and reading portion 8 to the home position, so that the motor 11 is stopped. Therefore, it is possible to effectively make use of the braking control according to the present invention so as to brake the motor 11 which is rotated in the reverse direction at a high speed to the predetermined low speed.

Furthermore, the present invention can be used as a control device for not only motors for image forming apparatuses, such, as the above described copying machine, but also motors used in the other apparatuses.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control device for controlling the rotation of a motor, said motor control device comprising:
   speed pulse outputting means connected to an axis of rotation of the motor for outputting a pulse corresponding to a rotational speed of the motor;
   motor driving mean for applying driving power to the motor;
   reference pulse generating means for generating a reference pulse in a case where the rotational speed of the motor is a predetermined reference speed;
   braking means for cutting off a supply of power to the motor from the motor driving means to keep the motor in a short-circuited state in order to decrease the speed of the motor, which is being rotated at a higher speed than said reference speed, to the reference speed; and
   braking releasing means for comparing the speed pulse outputted from the speed pulse outputting means with the reference pulse generated by the reference pulse generating means during operation of the braking means to release the operation of the braking means at a time when the speed pulse is synchronized with the reference pulse.

2. The motor control device according to claim 1, wherein said motor driving means includes:
   a servo circuit for comparing the speed pulse outputted from the speed pulse outputting means with the reference pulse outputted from the reference pulse generating means to output a servo signal corresponding to a result of this comparison,
   a PWM circuit for outputting a pulse width modulation signal having a duty ratio corresponding to the servo signal outputted from the servo circuit, and
   a motor driving circuit for supplying a current to the motor based on the pulse width modulation signal outputted from the PWM circuit.

3. A motor control device in an image forming apparatus, said motor control device comprising:
   speed pulse outputting means connected to an axis of rotation of a motor for outputting a pulse corresponding to a rotational speed of the motor;
   speed command pulse outputting means for outputting a high speed command pulse for rotating the motor at a speed higher than a process speed required for an image forming process and a reference command pulse for rotating the motor at the process speed, the process speed being lower than the high speed;
   motor driving means for applying driving power to the motor corresponding to the command pulse from the speed command pulse outputting means;
   braking means for cutting off a supply of power to the motor from the motor driving means to keep the motor in a short-circuited state in response to a switching of the output of the speed command pulse outputting means to the reference command pulse while the motor is rotated at a high speed based on the high speed command pulse; and
   braking releasing means for comparing the speed pulse outputted from the speed pulse outputting means with said reference command pulse during operation of the braking means to release the operation of the braking means at a time when the speed pulse is synchronized with the reference command pulse.

4. The motor control device according to claim 3, wherein said motor driving means includes:
   a servo circuit for comparing the speed pulse outputted from the speed pulse outputting means with the command pulse outputted from the speed command pulse outputting means to output a servo signal corresponding to a result of this comparison,
   a PWM circuit for outputting a pulse width modulation signal having a duty ratio corresponding to the servo signal outputted from the servo circuit, and
   a motor driving circuit for supplying a current to the motor based on the pulse width modulation signal outputted from the PWM circuit.

5. The motor control device according to claim 3 wherein
   said image forming apparatus comprises an image transfer mechanism for transferring a formed image to paper, and a paper feeding roller for feeding the paper to the image transfer mechanism, and
   said motor is a motor for rotating the paper feeding roller.

6. The motor control device according to claim 5 wherein
   said image transfer mechanism has paper holding means for holding paper at the time of transferring an image, and
   the paper feeding roller is a paper feeding timing roller for feeding the paper to the paper holding means at predetermined timing.

7. The motor control device according to claim 6 wherein
   said motor is rotated at a high speed when said paper feeding timing roller starts to feed the paper and then, said motor is braked after an elapse of a constant time.

* * * * *